Dec. 11, 1945. A. G. McNISH 2,390,844

QUADRANTAL CORRECTOR FOR MAGNETIC COMPASSES

Filed Sept. 27, 1943

INVENTOR.
Alvin G. McNish
BY C. E. Herrstrom &
H. E. Thibodeau
ATTORNEYS.

Patented Dec. 11, 1945

2,390,844

UNITED STATES PATENT OFFICE 2,390,844

QUADRANTAL CORRECTOR FOR MAGNETIC COMPASSES

Alvin G. McNish, Washington, D. C., assignor to the United States of America, as represented by the Secretary of War Application September 27, 1943, Serial No. 503,985

3 Claims. (Cl. 33—225)

This invention relates generally to magnetic compasses for use in vehicles (land, air and marine) and more particularly to improved means for compensating for quadrantal deviation.

Up to the present time, it has been customary to correct quadrantal deviation in tanks, aircraft, boats and other vehicles by placing soft iron spheres on opposite sides of the magnetic compass, the theory being that these spheres become magnetic due to the earth's field and accordingly interact on the compass to produce the necessary compensation for quadrantal deviation. This method of compensation has been found to be cumbersome, however.

It has also been a practice to compensate for quadrantal deviation by mounting bars of soft iron beneath or above the compass. The theory of this arrangement is that these bars also are affected by the earth's field. In both of the above mentioned types of correction apparatus, the magnitude of the effect has been varied by changing the distance between the correctors and the compass. Since it is frequently necessary to correct for both the D and E terms in the compass deviation, provision has frequently been made for sluing these spheres or rods. The method of making this correction is difficult to carry out, however.

In many cases, owing to the fact that the compass magnets are excessively strong, the above mentioned correctors have not operated exactly in the manner called for by the theory, but have also been caused to function partly as a result of magnetism induced in them by the compass needles themselves. As a result, the amount of the correction supplied by the spheres and bars varies with the strength of the earth's magnetism where the vehicle is operating.

One of the principal objects of the present invention, therefore, is to provide apparatus for correcting both the D and E quadrantal deviation wherein the compensation obtained depends entirely upon the induction of the compass needles.

Another object of the invention is to provide apparatus for correcting quadrantal deviation which is simple in arrangement and which may be readily mounted to operate with a compass.

A further object of the invention is to provide apparatus of this character wherein means is employed for permitting the simultaneous adjustment of both the D and E corrector elements without varying their relative magnitudes with respect to the compass needles according to the intensity of the earth's magnetic field.

Still another object of the invention is to provide apparatus for correcting quadrantal deviation which may be adjusted for varying the magnitude of correction for the D and E terms independently each of the other.

Further objects of the invention, not particularly mentioned hereinabove, will become apparent as the description proceeds.

Figure 1:
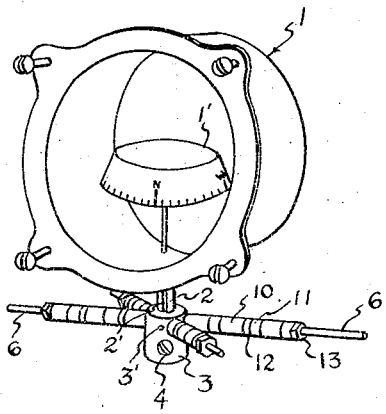
Figure 1 is a perspective view showing the quadrantal correctors as they would appear installed on a magnetic compass.

Referring to the drawings and first to Figure 1, the numeral 1 indicates generally a magnetic compass of suitable design. The compass 1 is provided with a card 1' which is mounted to rotate in a horizontal plane.

Figure 2:
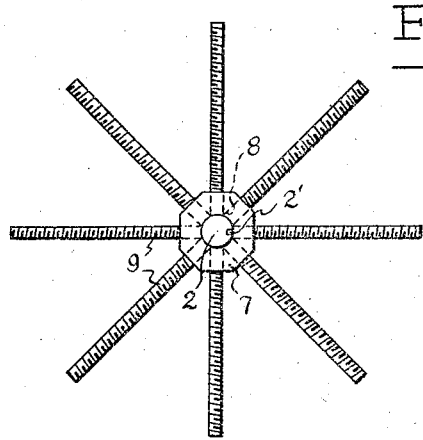
Figure 2 is a top plan view of a modified form of compensator unit separated from the compass.

Mounted on the case of the compass and depending therefrom is a mounting stem 2, said stem having a slot 2', the purpose for which will be discussed hereinafter. Movably mounted on the lower end portion of the stem 2 is a hub 3 preferably of highly permeable ferro-magnetic material, having low hysteresis. The hub 3 is normally rigidly secured in a selected position on the mounting stem by a set screw 4. In this connection, it should be understood that the hub is held against rotation on the stem by a suitable key 3' which is engageable in the key slot 2'. Said hub may be of cylindrical shape, or as shown in Figure 2, may be of octagonal shape. Arms 6 radiate from the hub in a horizontal plane at an angle of 45° to each other. The function and accessories of these arms will be described in connection with Figure 2.

The octagonal hub 7 shown in Figure 2 is formed with radial openings 8 at the faces. A threaded leg 9 is inserted in each opening. The legs are preferably non-magnetic. In Figure 1, only four of the legs are shown in operative position. However, as shown in Figure 2, eight legs may be mounted on the hub.

Figure 4:
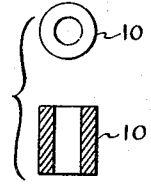
Figure 4 is a detail plan and sectional view of one of the collars employed.
Figure 5:
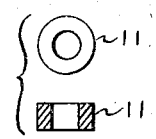
Figure 5 is a detail plan and sectional view showing a collar similar to the one shown in Figure 4 but of smaller length.
Figure 6:
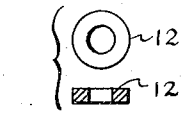
Figure 6 is a detail plan and sectional view showing a collar of still smaller length.
Figure 3:
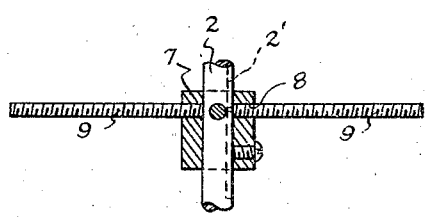
Figure 3 is a sectional view, partly in elevation, of the unit shown in Figure 2.
Figure 7:
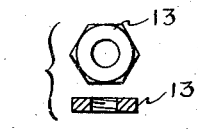
Figure 7 is a detail plan and sectional view of one of the retaining nuts.

It should be understood that although the hub and legs are shown as being mounted on the compass, it is obvious that they may be positioned on suitable supporting means adjacent to said compass but independent thereof. Removably mounted on the legs 9 are collars 10, 11 and 12 which are, as shown in Figures 4, 5 and 6, of different lengths and of a suitable magnetic material so that their additive effect may be varied.

In use, the hub and leg assembly is set at a fixed distance from the compass needle by means of a calibrated scale, the positioning of the assembly depending upon the intensity of the earth's magnetic field in which the vehicle is operated. The magnitude of the correction needed for a given position is then adjusted by varying the amount of magnetic matter, i. e. the collars, on the legs 9. The collars are then secured by a nut 13 on each leg.

In order to avoid the confusing and tedious procedure of determining the relative magnitudes of the D and E terms, and adjusting the angle of the correctors accordingly, I provide, by the eight legs with the collars thereon, means for correcting for the D and E terms independently. Thereafter, changes in correction, as required by changes in latitude of the vehicle, may be made with a minimum of difficulty since both D and E will be affected proportionately when the distance of the leg assembly or spider from the compass is varied by bodily shifting the hub 3 with the legs 9 and collars carried thereby.

A conventional needle may be employed in lieu of the card 1'. The term "needle" in the claims is intended to be generic to both forms.

Although specific embodiments of the invention have been illustrated and described, it will be understood that various alterations in the details of construction may be made without departing from the scope of the invention as indicated by the appended claims.

What I claim is:

1. In combination with a magnetic compass having a needle, means for compensating for quadrantal deviation comprising a support having supporting elements spaced at 45° intervals around the axis of said compass, magnetic elements, said supporting elements being adapted to hold varying quantities of said magnetic elements, and means for retaining said support at varying distances vertically from said compass.

2. In combination with a magnetic compass having a needle, means for compensating for quadrantal deviation comprising a mounting stem in the axial line of the compass, a hub on said mounting stem, legs extending horizontally and radially from said hub, and collars of magnetic material removably mounted on said legs, the number of said collars on said legs being variable for permitting correction of both the D and E terms in the compass deviation.

3. In combination with a magnetic compass having a needle, means for compensating for quadrantal deviation comprising a mounting stem in the axial line of the compass, a hub mounted for adjustment on and along said mounting stem, legs extending horizontally and radially from said hub, and collars of magnetic material removably mounted on said legs, the number of said collars on said legs being variable for permitting correction of both the D and E terms in the compass deviation.

ALVIN G. McNISH.